Sept. 13, 1960 H. B. O. DAVIS ET AL 2,952,408

ELECTRONIC MULTIPLIER

Filed May 4, 1955 3 Sheets-Sheet 1

INVENTORS
HENRY B. O. DAVIS
ROBERT A. MEYERS
BY George Sipkin
B. L. Zangwill
ATTORNEYS Sept. 13, 1960 H. B. O. DAVIS ET AL 2,952,408

ELECTRONIC MULTIPLIER

Filed May 4, 1955 3 Sheets-Sheet 2

INVENTORS
HENRY B. O. DAVIS
ROBERT A. MEYERS
BY George Sipkin
B. L. Zangard
ATTORNEYS

ELECTRONIC MULTIPLIER

Filed May 4, 1955 3 Sheets-Sheet 3

INVENTORS
HENRY B. O. DAVIS
ROBERT A. MEYERS
BY George Sipkin
B. L. Zangwill
ATTORNEYS 2,952,408

ELECTRONIC MULTIPLIER

Henry B. O. Davis, 10207 Frederick Ave., Kensington, Md., and Robert A. Meyers, 7723 Eastern Ave. NW., Washington, D.C.

Filed May 4, 1955, Ser. No. 506,100

1 Claim. (Cl. 235—194)

(Granted under Title 35, U.S. Code (1952), sec. 266)

The invention described herein may be manufactured and used by or for the Government of the United States of America for governmental purposes without the payment of any royalties thereon or therefor.

This invention relates to an electronic multiplier; and more particularly, to a four quadrant multiplier of relatively simple design having good stability coupled with a high degree of accuracy.

An object of this invention is the provision of a stable, accurate four-quadrant electronic multiplier.

Another object of this invention is the provision of an electronic multiplier which has a wide dynamic range and high output voltage.

Still another object of this invention is the provision of an electronic multiplier which will multiply infinite wavelength signals with practically zero D.-C. drift.

A further object of this invention is the provision of an electronic multiplier having a linear response and in which drift effects are negligible.

Yet another object is to provide a triangular waveform generator.

Still yet another object is to provide a stable direct coupled amplifier having a high gain.

Other objects and many of the attendant advantages of this invention will be readily appreciated as the same becomes better understood by reference to the following detailed description when considered in connection with the accompanying drawings wherein.

The general principle of operation of an electronic multiplier in accordance with the invention can be stated by the equation $$KE_1E_2=\text{avg}[|E_1+E_2+E_c|-|E_1-E_2+E_c|] \quad (1)$$

This equation is valid if $E_c$ is assumed to be a linearly varying waveform, and $(\pm E_1)+(\pm E_2)$ is less than or equal to the peak value of $E_c$; where $E_c$ is the carrier voltage, $E_1$ and $E_2$ are the two input voltages, and K is a constant. It is obvious from the signs of the inputs voltages that four quadrant operation is possible, e.g. either positive or negative polarity signals may be applied to either input.

The underlying theory of operation of the multiplier is based in the fact that the average area of an alternating waveform having a period $t$ is zero. If however the amplitude of a linearly varying waveform is varied in accordance with one signal and the width of the waveform by another during the period $t$, the average area of the waveform modified by the two signals will be proportional to the product of the two signals.

Figures 1, 2:
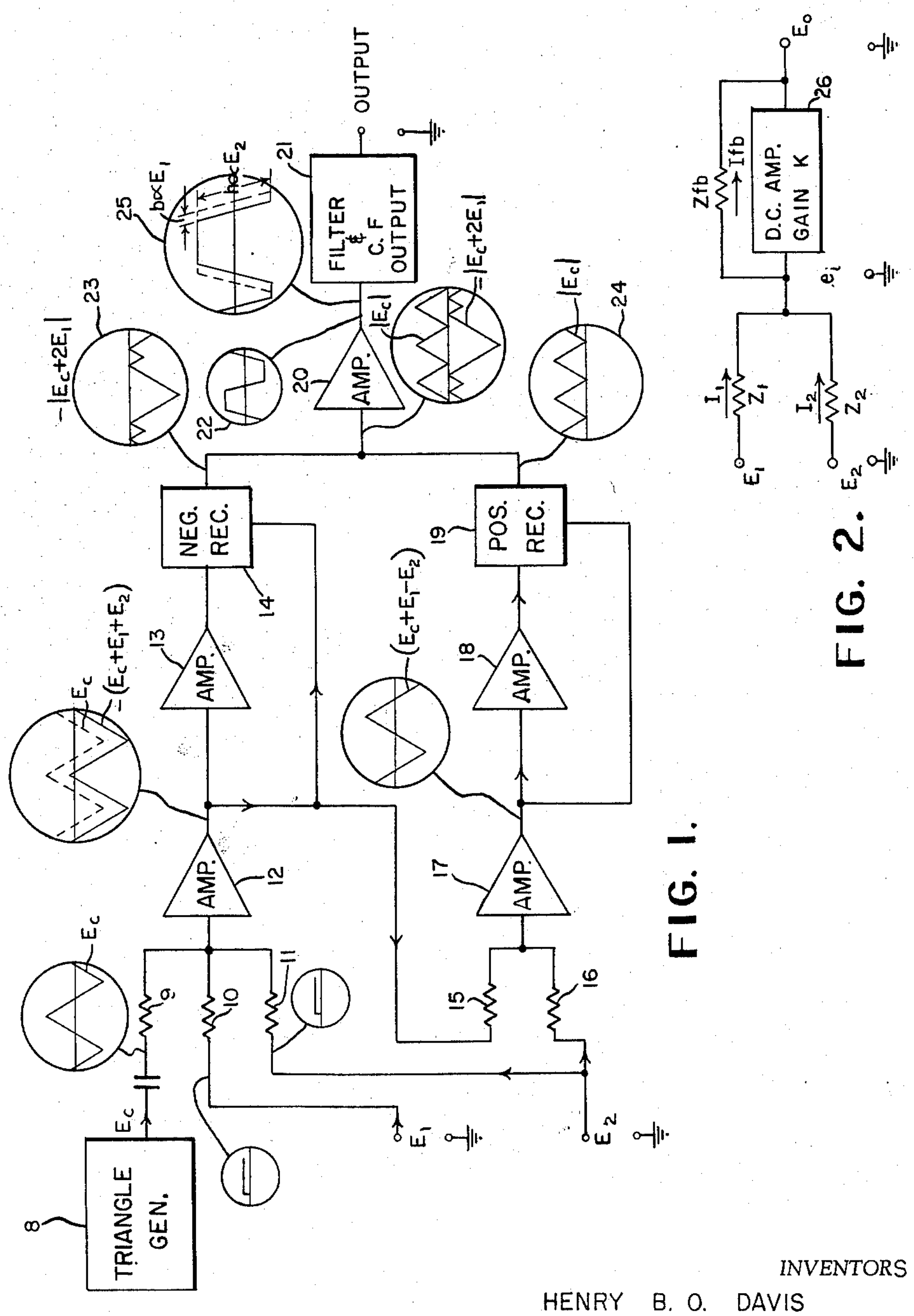
Fig. 1 is a block diagram of the electronic multiplier.
Fig. 2 is a block diagram illustrating the operation of a D.-C. operational amplifier.

The circuit for performing the operations indicated by Equation 1 is shown in the block diagram of Fig. 1.

As may be seen, the carrier voltage $E_c$ from generator 8 and the two input signals $E_1$ and $E_2$ are added in a one-to-one ratio, as determined by resistors 9, 10 and 11, in amplifier 12 to produce the output voltage $-(E_1+E_2+E_c)$. This sum is then fed into amplifier 13 for inversion and the two quantities $+(E_1+E_2+E_c)$ and $-(E_1+E_2+E_c)$ are simultaneously applied to a full wave rectifier 14. This rectifier provides the absolute magnitude function $|E_1+E_2+E_c|$ with the quantity negative. The reason for this negative quantity will be seen later.

The output of amplifier 12 and the input $E_2$ are added in amplifier 17 with a weighing factor of 2 for $E_2$ as determined by resistors 15 and 16. The output of amplifier 17 is therefore $-[-(E_1+E_2+E_c)+2E_2]$ or reducing $(E_1-E_2+E_c)$. The sign of this quantity is changed in amplifier 18 and the outputs of amplifiers 17 and 18 are applied to a full wave rectifier 19. This rectifier provides the quantity $|E_1-E_2+E_c|$. It is the difference of the two absolute magnitudes which provides the difference function to be averaged in obtaining the true product of $E_1$ and $E_2$. Because the output polarity of rectifier 14 is negative the difference function is obtained by adding the two absolute magnitudes in amplifier 20. The resulting difference function is then fed into a low pass filter 21 as described by W. J. Cunningham "Performance Curves for M-Derived Filters" Cruft Lab. Report Harvard University September 1942, and the output of this filter is the product $KE_1E_2$.

A graphical analysis of this method of multiplication is given in the following paragraphs.

Referring to Equation 1 let $|E_1+E_2+E_c|=A$ and $|E_1-E_2+E_c|=B$. Then the average value of $$|A|-|B|=KE_1E_2$$

Assuming a triangular waveform carrier $E_c$, with a D.-C. input to $E_2$ and $E_1=0$ the difference function becomes $|E_c+E_2|-|E_c-E_2|$. The amplitude of the A and B functions alternate in amplitude every cycle. By taking the difference of these wave forms the output becomes a waveform such as shown at 22. It can be seen that this difference function $E_0$ is an alternating trapezoidal waveform symmetrical about zero. The average of this waveform is therefore zero.

If now $E_2$ is assumed zero then the equation becomes $$|E_c+E_1|-|E_c+E_1|$$

which is equal to zero, and no difference function is produced in this case.

It is seen therefore that when $E_2=0$, $E_1$ has no effect on the output and similarly, when $E_1$ is zero $E_2$ produces the symmetrical difference function of $E_0$ shown at 22, but since its average value is zero, no multiplier output voltage is produced.

Assume now that $E_1=E_2$ and noting the waveforms shown, the difference function $|A|-|B|$ becomes $$|E_c+2E_1|-|E_c|$$

The A and B functions are shown at 23 and 24. It is noticed that because the magnitude of the two functions alternate every cycle the effect after subtracting is to reduce the width of the negative half of the cycle and increase the positive half. The average value is no longer zero but has shifted in a positive direction. The result of applying $E_1$ is shown in solid lines at 25. It is to be noticed that the amplitude of the difference function $E_0$ has not increased but the symmetry was altered by $E_1$. The result obtained is an output waveform in which $E_1$ changes the width of the pulse and $E_2$ the height. During normal operation as long as $E_c$ is higher in frequency than either $E_1$ or $E_2$ then the distance "$b$" at 25 approximates a straight line for every cycle of $E_c$.

The average value of this difference function must be equal to the algebraic sum of the trapezoid areas over any complete cycle of $E_c$. From 25, which shows one complete cycle, this difference in area can be seen to be equal to $$4\frac{hb}{2}=2bh$$

and since $b\alpha E_1$ and $h\alpha E_2$ then the average of this difference function is equal to $2KE_1E_2$ or $K_1E_1E_2$ which proves that $$\text{avg}[|E_1+E_2+E_c|-|E_1-E_2+E_c|]=K_1E_1E_2$$

As is apparent a method of adding the signals to a linearly varying carrier to obtain accurate results is necessary, and Fig. 2 shows in block diagram the theory of the stable D.-C. operational amplifier and the necessary circuitry wherein accurate addition of a plurality of input signals may be accomplished. In Fig. 2 a D.-C. amplifier 26 having a high internal or loop gain of K is connected in series with two parallel input resistors $Z_1$ and $Z_2$ and a feed back resistor $Z_{fb}$. Two input voltage sources $e_1$ and $e_2$ are connected in series with resistors $Z_1$ and $Z_2$ and by Kirchoffs law (1) $$e_1=Z_1I_1+e_i$$

(2) $$e_2=Z_2I_2+e_i$$

(3) $$e_i=Z_{fb}I_{fb}+e_0$$

(4) $$e_i=\frac{-e_0}{K}$$

where $e_i$ is the voltage applied to the amplifier input and $e_0$ is the output voltage.

Solving Equations 1 and 2 for current (5) $$I_1=\frac{e_1-e_i}{Z_1}$$

and (6) $$I_2=\frac{e_2-e_i}{Z_2}$$

and assuming zero grid current, then $I_{fb}=I_1+I_2$. Hence Equations 5 and 6 may be added and substituted for $I_{fb}$ in Equation 3 giving $$e_i=Z_{fb}\left(\frac{e_1-e_i}{Z_1}+\frac{e_2-e_i}{Z_2}\right)+e_0$$

Substituting Equation 4 for $e_i$ the result is $$\frac{-e_0}{K}=Z_{fb}\left(\frac{e_1}{Z_1}+\frac{e_0}{KZ_1}+\frac{e_2}{Z_2}+\frac{e_0}{KZ_2}\right)+e_0$$

As the gain K of the amplifier is very large compared to unity the K terms approach zero and may be neglected leaving $$-e_0=Z_{fb}\left(\frac{e_1}{Z_1}+\frac{e_2}{Z_2}\right)$$

Hence it is apparent that the output voltage is proportional to the sum of the input voltages. This relation holds for any number of input voltages.

Figure 3:
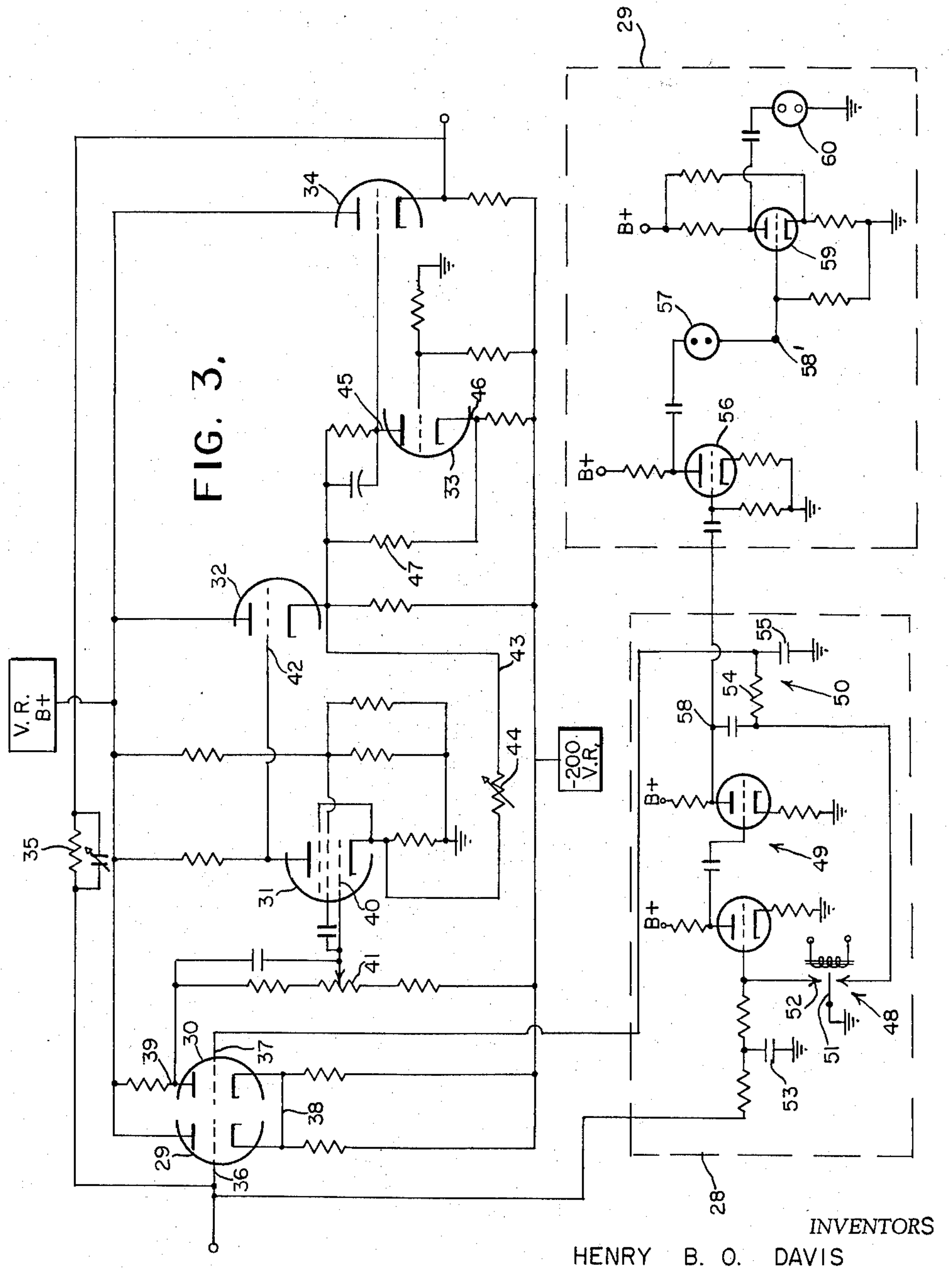
Fig. 3 is a schematic diagram of a D.-C. operational amplifier of Fig. 2 with a balancing and overload circuit.

In Fig. 3 there is shown a schematic diagram of one of the D.-C. operational amplifiers with an associated balancing circuit 28 and an overload indicator circuit 29. The amplifier comprises broadly a differential input stage consisting of triodes 29 and 30, a D.-C. amplifier stage consisting of a pentode amplifier 31 coupled to a cathode follower triode 32, and an output stage consisting of a constant current coupling triode 33 coupled to an output cathode follower 34. A feedback path including feedback resistor 35 couples the output back to the input triode of the differential stage. The value of the input and feedback resistors are such that the overall gain of the operational amplifier may be any value desired. A condenser across resistor 35 in the feedback path may be adjusted for maximum frequency response.

As the multiplier must have a frequency response down to zero, D.-C. amplifiers are used. As such amplifiers, despite regulated power supplies, are subject to drift some means for compensating or balancing out drift is necessary. This is the function of the differential stage. Because of the relation between input resistors and feedback resistor the grid 36 of triode 29 is maintained substantially at ground potential and the grid 37 of triode 30 is normally at ground potential. Hence, because of the common cathode connection 38 between triodes 29 and 30 any drift or change in the grid to cathode voltage of either triode 29 or triode 30 will affect the grid to cathode voltage of the other thereby tending to compensate for drift.

The output of the differential stage, taken from plate 39 of triode 30, is therefore an amplified version of the signal applied to the input grid 36 of triode 29. The amplified signal is coupled to grid 40 of pentode 31 through a D.C. balance potentiometer 41 in the plate circuit of triode 39 and is amplified in pentode 31 and coupled to the grid 42 of cathode follower 32. A positive feedback connection 43 including an adjustable feedback resistor 44 is provided to adjust the internal or loop gain of this stage for maximum gain commensurate with stability. The output of cathode follower 32 is fed to the plate 45 of triode 33 and to the cathode 46 thereof through a high resistance 47. The arrangement is such that triode 33 acts as a constant current coupling tube since as the plate potential varies the grid to cathode potential varies thereby maintaining a constant plate current. This output is coupled to cathode follower 34 and then fed back to the input grid of triode 29. The purpose of triode 33 is to couple the output of cathode follower 32 to output cathode follower 34 without attenuation. The output of cathode follower 34 will be proportional to the sum of the input signals. The purpose of the D.-C. balance potentiometer 41 is to adjust the output to zero with the input grid 36 grounded.

Although the above amplifier is satisfactory, should drift be appreciable, an automatic balancing circuit 28 substantially as described in R.C.A. Review, vol. XI #2 p. 296 (June 1950) may be used with its input connected to grid 36 and its output connected to grid 37. The balancing circuit comprises a conventional chopper 48 in conjunction with an auxiliary A.C. amplifier 49 and an R-C filter 50. The balancing circuit acts to apply any variations at the grid 36 of triode 29 to the grid 37 of triode 30 to thereby reduce the percentage of drift. Any variations at grid 36 are chopped by a vibrator 51 operating at 60 cycles. On each alternate cycle of vibrator 51 contact 52 is grounded and condenser 53 discharges. The effect is that the output of amplifier 49 is half wave rectified and after filtering by the combination of resistor 54 and capacitor 55, which block out chopper and high frequency signals, the D.C. output is fed to grid 37 where it is added to the directly coupled signal by means of the common cathode connection so as to make the gain of the differential stage the product of its own gain times the gain of the auxiliary amplifier. Due to this increase in gain the overall gain of the differential stage is so high that drift becomes negligible.

Each amplifier is provided with an overload circuit comprising a triode 56 and a glow tube 57 in the plate circuit thereof which will be actuated when a predetermined drift or overload voltage appears at the output junction 58 of amplifier 49. Hence any overload or drift which will cause the plate current of triode 56 to vary will cause glow tube 57 to indicate the overload. Each individual overload circuit is coupled to a common junction point 58' and should any of the individual circuits experience an overload a master indicator circuit comprising a normally cut off triode 59 and a glow tube 60 will be actuated.

Figure 4:
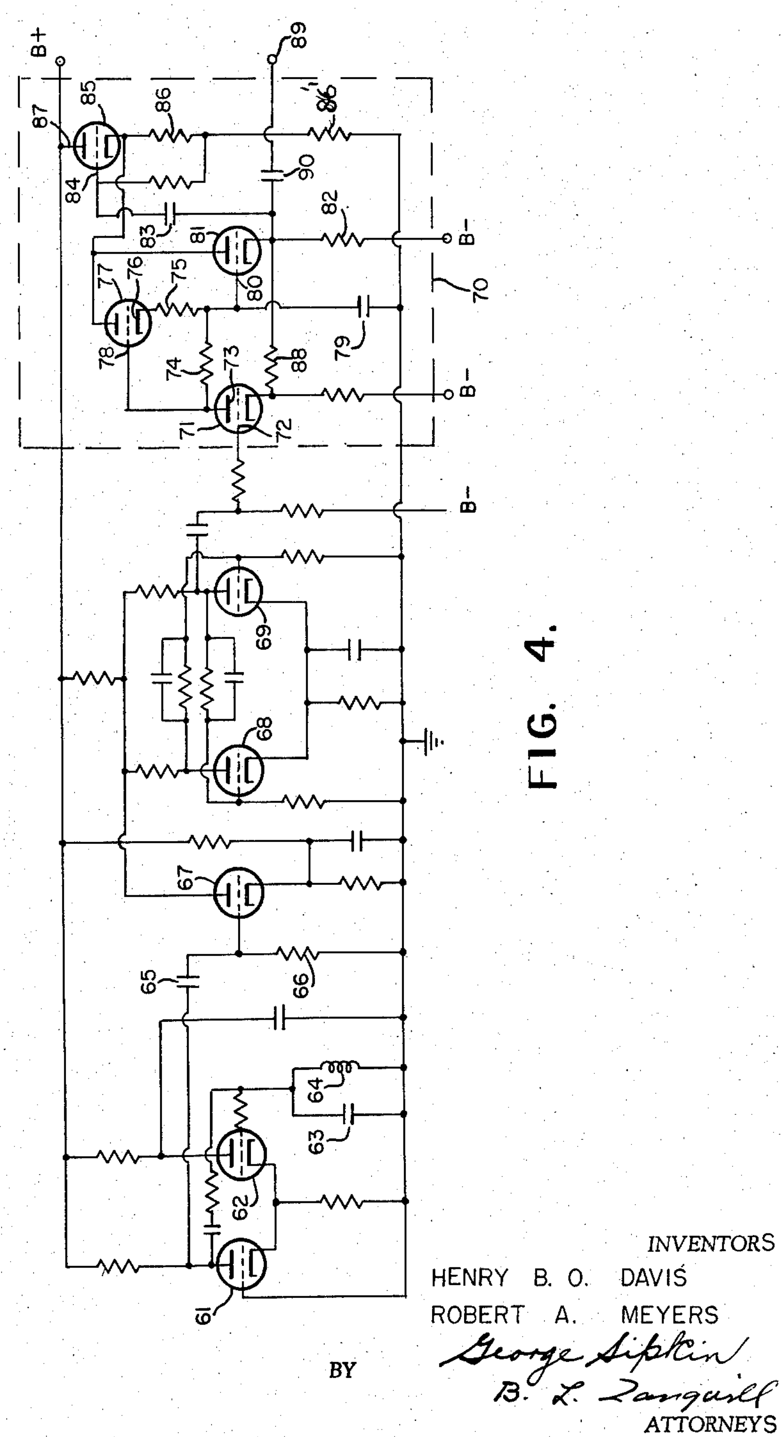
Fig. 4 is a schematic diagram of a triangular waveform generator.

While any linearly varying carrier may be used, Fig. 4 shows a triangular voltage generator comprising a bootstrap or negative resistance oscillator comprising triodes 61 and 62 which function as a negative resistance shunted across a tank circuit comprising capacitor 63 and inductance 64. The output from the plate of triode 62 is a very stable square wave that is differentiated by series connected capacitor 65 and resistance 66. The differentiated pulses are led from the junction of capacitor 65 and resistor 66 to the grid of a normally cut off triode 67 which conducts only the positive differentiated pulses. The negative pulses developed at the plate of triode 67 are injected into the plate circuits of triodes 68 and 69 connected to operate as a multivibrator trigger circuit having two stable states. Each negative pulse from triode 67 causes the multivibrator to shift from one stable state to the other. The output of the multivibrator therefor is a very stable symmetrical square wave at ½ the frequency of the bootstrap oscillator and is used to control the switching operation of a triangular waveform generator 70.

The triangular carrier generator comprises a first input triode 71 having its grid 72 coupled to the output of the multivibrator trigger circuit. The plate 73 of triode 71 is connected through resistors 74 and 75 to the cathode 76 of a triode 77 and directly to the grid 78 of the triode 77. The junction of resistors 74 and 75 is connected to a capacitor 79 and the grid 80 of a triode 81. The output of triode 81 developed across a cathode resistor 82 is coupled via a condenser 83 to the grid 84 of a triode 85 having a cathode resistor 86 and a current limiting resistor 86'. The plates of triodes 77 and 81 are connected across cathode resistor 86 and 86'. The plate 87 of triode 85 is connected to a source of B+ and the cathodes of triodes 71 and 81 are connected to a source of B— and together through a delineating resistor 88. The output of the triangular carrier is taken from terminal 89 via coupling condenser 90. In the quiescent stage all the triodes are conducting. Triodes 77 and 81 obtaining B+ across cathode resistor 86 and 86' and triode 71 obtaining B+ across resistor 74 and 75.

In operation a negative square wave pulse from the trigger circuit cuts off triode 71 thereby decreasing the bias on triode 77 and causing capacitor 79 to charge. As capacitor 79 charges the bias on triode 81 decreases causing it to conduct more heavily. The increased drop across cathode resistor 82 decreases the bias on triode 85 and the voltage drop across cathode resistor 86 increases accordingly. This increased drop across resistor 86 increases the plate voltage of triode 77 causing it to operate as a constant current triode. Hence the rate of change of the charge on capacitor 79 is maintained constant and a linearly increasing output voltage is obtained at terminal 89. Upon application of a positive pulse triode 71 conducts heavily cutting off triode 77. Capacitor 79 thereupon begins to discharge through triode 71. The discharge is made to have a constant current characteristic because of the effect of the cathode resistance of triode 71 and the high resistance 88 connected between triodes 71 and 81 on the action of triode 71. The cathode of triode 81 following grid 80 as capacitor 79 discharges causes a drop across the cathode resistor of triode 71 to thereby maintain a constant potential between the plate and cathode of triode 71. The discharge is therefor at a constant rate and a linearly decreasing voltage is developed at terminal 89, which together with the linearly increasing voltage forms a very linear triangular carrier.

Obviously many modifications and variations of the present invention are possible in the light of the above teachings, e.g. it is apparent that ganged input attenuators may be used at the inputs of the multiplier to maintain the proper ratio of input to feedback resistors for each attenuator step to enable a wide range of input signals to be multiplied; the frequency response may be increased by using a higher frequency carrier; the averaging may be done in each rectifier output before subtracting for a greater dynamic range and output voltage, and by combining functions, fewer operational amplifiers could be used. It is therefore to be understood that within the scope of the appended claims the invention may be practiced otherwise than as specifically described.

What is claimed is:

An apparatus for obtaining the product of a pair of input voltages comprising input means for a linearly varying voltage $E_c$, a first input means for a first voltage $E_1$ of said input voltages, a second input means for a second voltage $E_2$ of said input voltages, a first amplifier and means connected to said input means for supplying said amplifier with an input $E_c+E_1+E_2$, whereby said amplifier has a sum output of $-(E_c+E_1+E_2)$, a second amplifier and means connected to the output of said first amplifier and to said second input means for supplying said second amplifier with an input $-(E_c+E_1-E_2)$, whereby said second amplifier has a sum output of $(E_c+E_1-E_2)$, rectifier means for taking the absolute magnitudes of each of said sum outputs, additional means for algebraically adding the output of the rectifier means, and means for averaging the output of said additional means to derive the product of said input voltages where said amplifiers and means for adding are D.-C. operational amplifiers comprising a plurality of input resistors, a D.-C. amplifier and a feedback resistor, said D.-C. amplifier comprising a differential input stage to compensate for drift, an amplifier stage including a positive feedback path whereby the internal gain is made high and stability is increased, a cathode follower, a constant current coupling stage connected between said amplifier and said cathode follower to reduce attenuation, and a feedback path connecting in series said cathode follower and said feedback resistor with the input of said differential stage.

References Cited in the file of this patent

UNITED STATES PATENTS

| | | |
|---|---|---|
| 2,439,324 | Walker | Apr. 6, 1948 |
| 2,522,957 | Miller | Sept. 19, 1950 |
| 2,674,409 | Lakatos | Apr. 6, 1954 |
| 2,685,000 | Vance | July 27, 1954 |
| 2,695,955 | Casey | Nov. 30, 1954 |
| 2,726,331 | Robinson | Dec. 6, 1955 |

OTHER REFERENCES

Electronic Analog Computers (Korn and Korn), published by McGraw-Hill Book Co., New York, 1952, page 214.

A New Electronic Multiplication Method Involving Only Simple Conventional Circuits (Mills), Magnolia Petroleum Co., Technical Report No. 680(00)-4, Nov. 9, 1953.

Electronics, April 1954, by D. W. Slaughter, "Time-Shared Amplifier Stabilizes Computers," pages 188–190.